Feb. 19, 1952  H. GELB  2,585,927
CAMERA AND STAND THEREFOR
Filed April 29, 1949  4 Sheets-Sheet 1
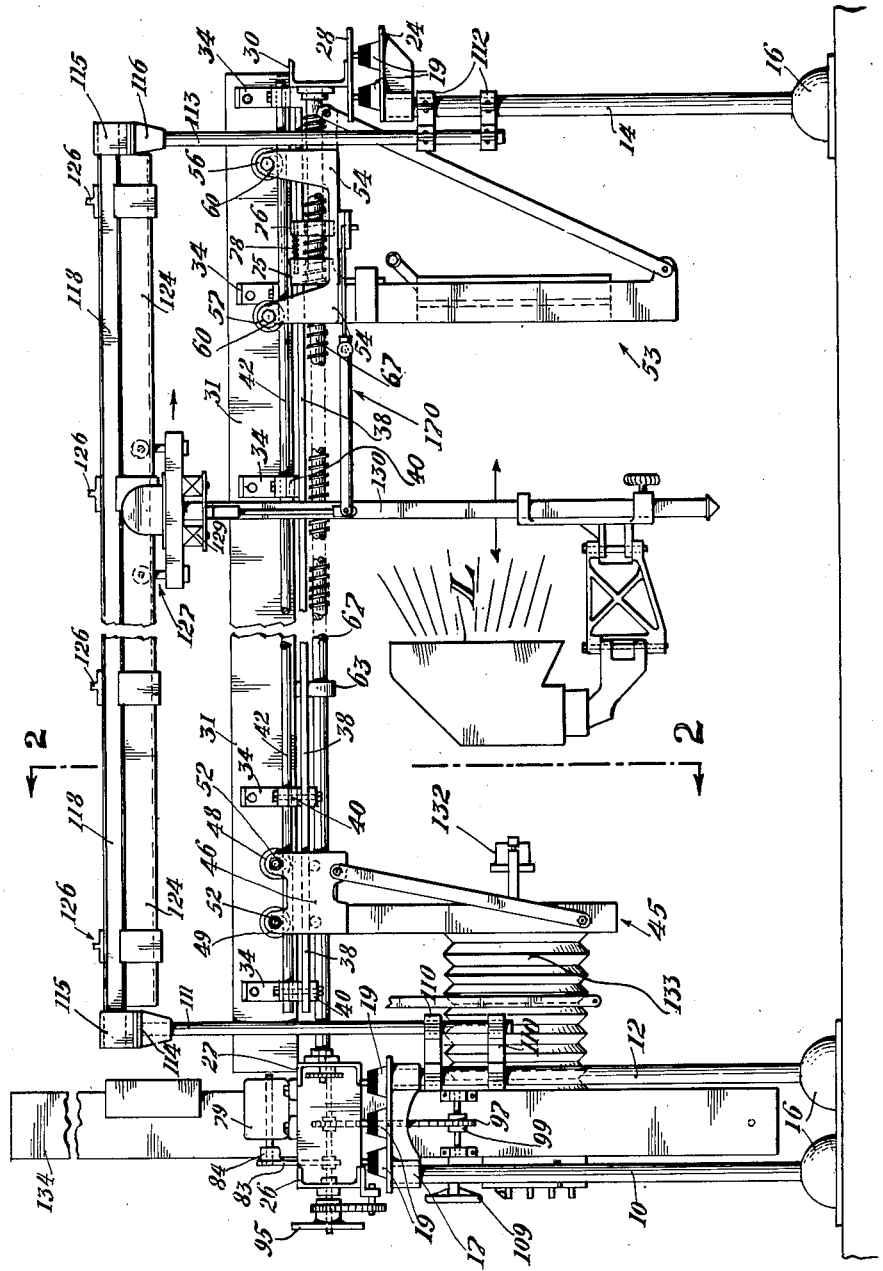
INVENTOR.
Herbert Gelb
BY
Attorneys

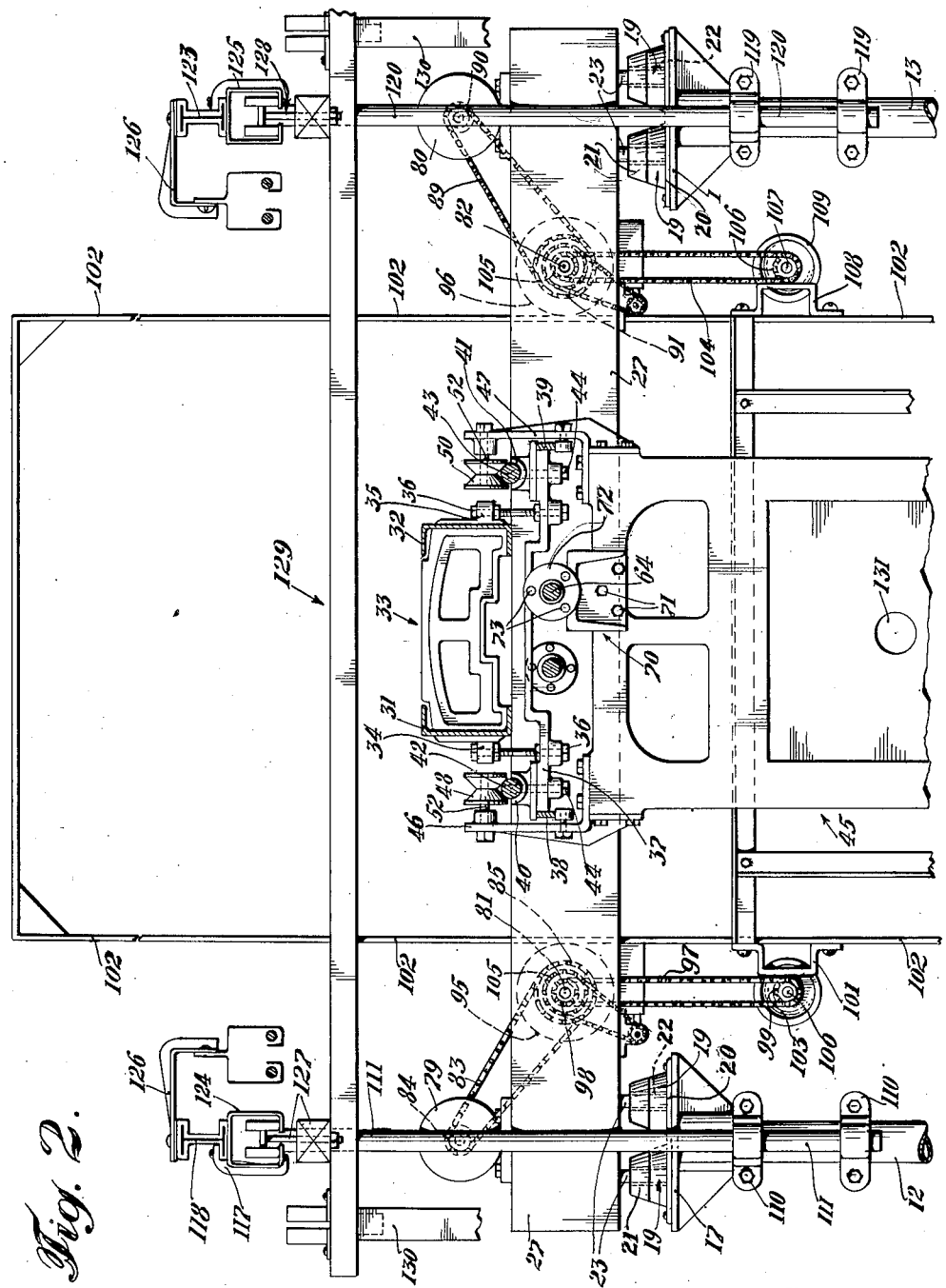

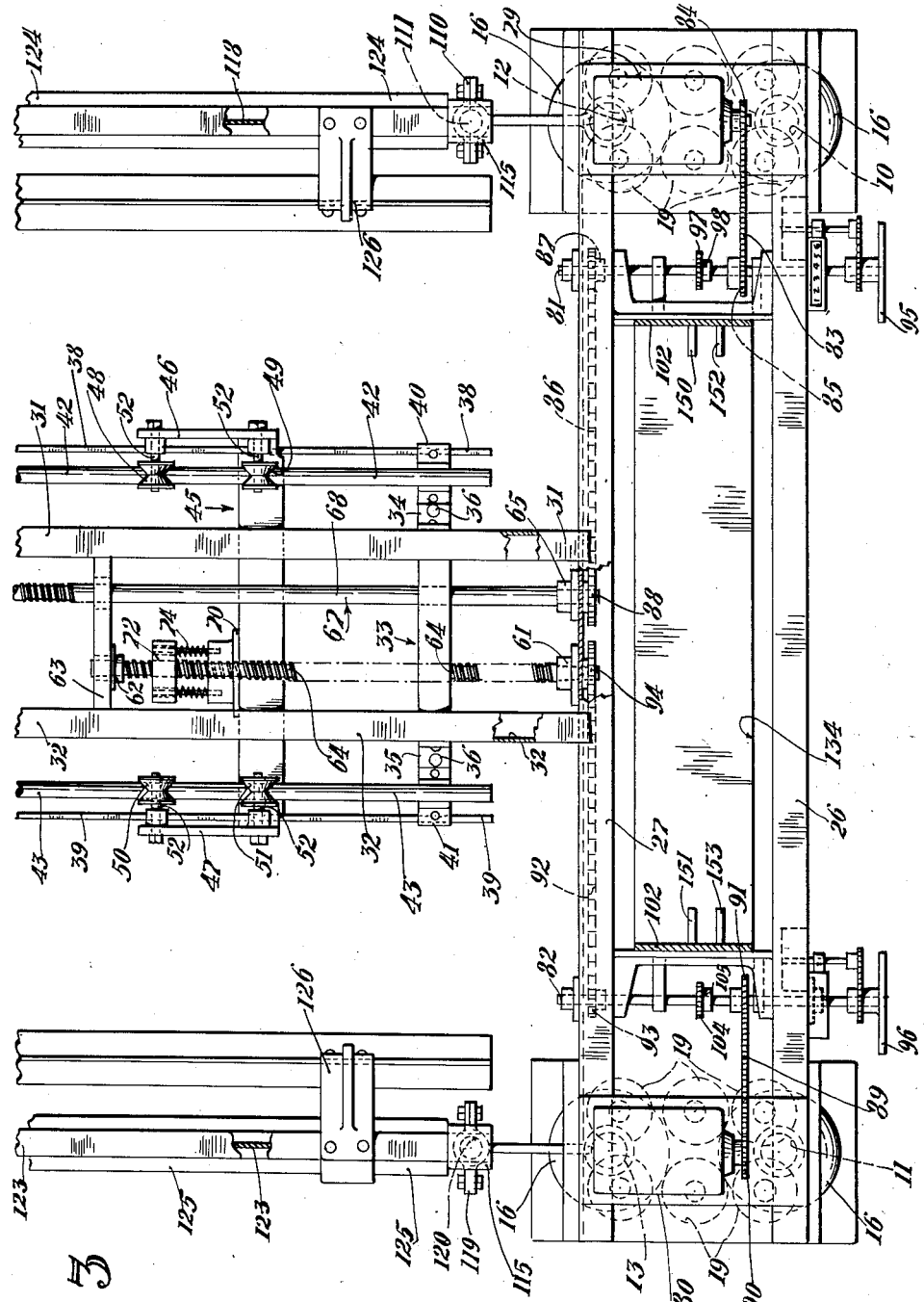

Patented Feb. 19, 1952

2,585,927

UNITED STATES PATENT OFFICE 2,585,927

CAMERA AND STAND THEREFOR

Herbert Gelb, New York, N. Y., assignor to Joseph Gelb Company, New York, N. Y.

Application April 29, 1949, Serial No. 90,311

24 Claims. (Cl. 88—24)

The invention relates to the art of photography.

Broadly described, the general object of the invention is to provide a heavy-duty stationary camera of novel construction and adapted to produce extremely accurate work.

A particular object of the invention is to provide a novel heavy-duty, stationary suspended camera capable of producing photoprinting of great accuracy even when installed in a building subject to considerable vibration. In connection with this object the present invention contemplates a simple, relatively inexpensive, and novel construction for a support for the camera obscura and its coöperating parts, which support makes possible a reaction to such vibration as a unit of the entire combination of working photographic parts of the invention. A particular purpose, here, of course, is to avoid independent vibration of the subject mounted on a copy board, of the lens and shutter arrangement, of a half-tone screen, when used, and of the sensitized plate desired to be photoprinted. While independent vibration of the flood lights in photography is, of course, not desirable, it is not of great importance; however, the combination of the present invention very materially reduces even this independent vibration. Those versed in photography as employed in lithography and other printing arts, as well as any workers in photography, will readily understand the value of protecting photographic equipment from externally applied shocks.

The support construction of the present invention is such that the complete camera obscura, with the sensitized plate to be photoprinted, and, when half tone work is required, the screen, and the copy board and its subject are rigidly, although adjustably, connected together as a common unit, this unit floating on a base structure. The obvious advantage is that the various parts of the photographic equipment do not change position with respect to each other in accordance with shocks transmitted by the floor of a building to said base structure.

Another object of the invention is to provide improved means for varying the photoprint scale with respect to that of the subject mounted on the copy board, and for preventing overthrow or back lash upon setting the copy board with respect to the camera lens. It is well known in the art that building vibration and loosely coöperating parts of a stationary camera frequently operate to upset a fine focal adjustment which has been carefully made prior to exposure. Thus the present invention contemplates means for varying the distance between the camera lens and the copy board, for purposes of enlargement and reduction, which means operate not only to prevent overthrow and back lash but also to prevent change of the selected distance setting due to vibration.

Another object of the invention is to provide such a camera having means accessible to an operator in the dark room, against which the camera abuts, whereby the distance between the camera lens and the copy board may be adjusted both by electric power and by hand, said means comprising indicators of the distance setting and vernier precision adjustments whereby the operator may blindly make an extremely accurate distance adjustment.

Another object of the invention is to provide such a camera wherein both the camera obscura and the copy board are suspended on a rigid bridge structure floating on a plurality of resilient supports.

A further object of the invention is to provide on such a bridge structure means for electrically varying the distance between the lens and copy board so that the entire assembly of photographic parts and their prime movers are together mounted on a common rigid base.

A further object of the invention is to provide a camera structure wherein the camera lens board, i. e., the seal of the front end of the bellows, and the copy board are individually suspended on trolleys having selfcentering V-wheels running on rails of circular cross section; and to provide simple means for finely adjusting and maintaining parallelism and straightness of said rails.

The invention further contemplates a heavy-duty, stationary camera for use by lithographers and others in the printing arts, which is adapted to be installed so that its screen and plate magazine may form a wall of a dark room.

A further object of the invention is to provide a photographic apparatus wherein both the camera lens board and a unit comprising the copy board and floodlights therefor are individually movable on trolleys riding on a bridge structure.

These and further objects will be more fully understood from the following description and from the drawing in which one embodiment of the invention is illustrated.

In the drawing:

Fig. 1 is a right side elevation of the camera.

Fig. 2 is the section 2—2 of Fig. 1, enlarged to fifty percent over the scale of Fig. 1.

Figure 44:
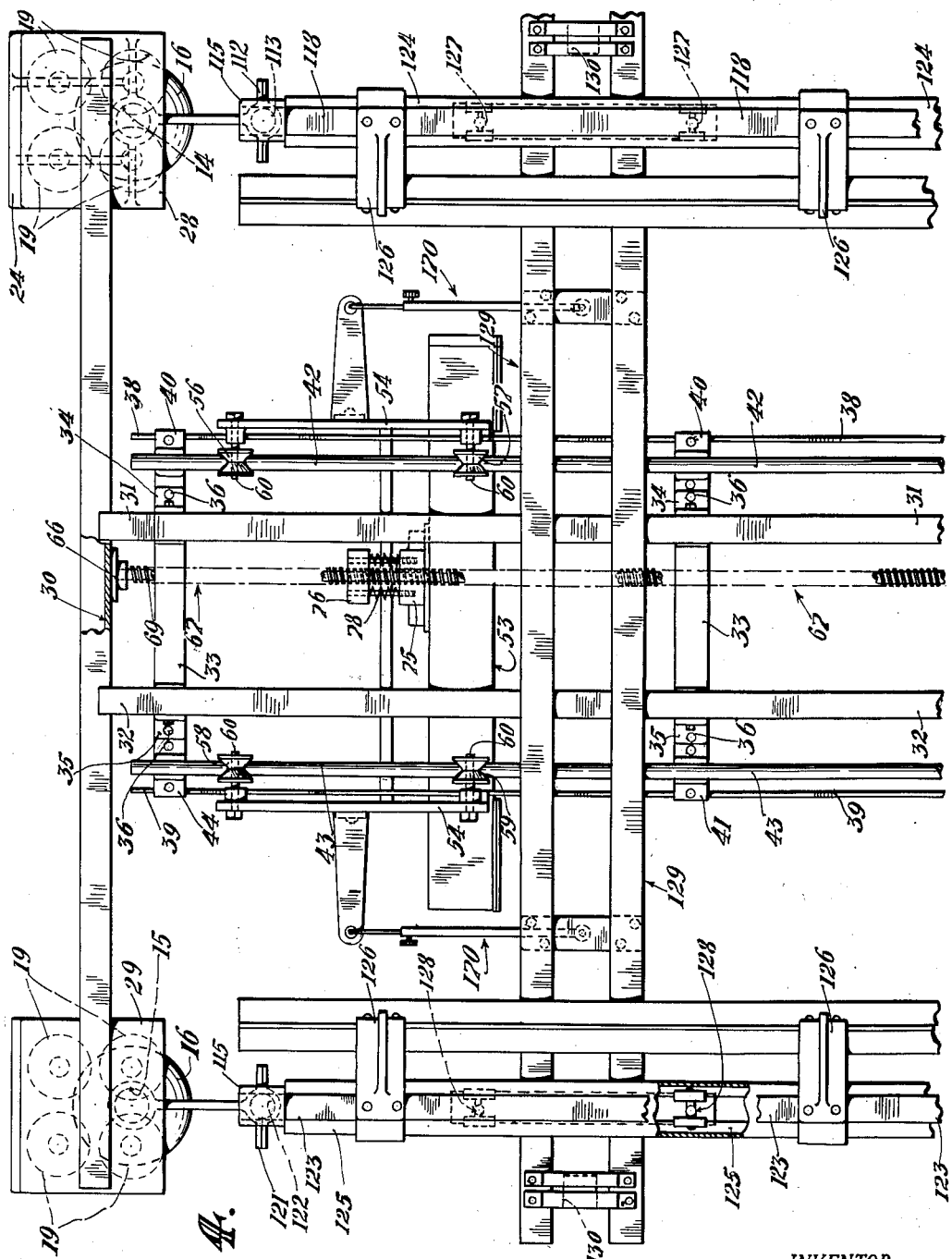

Figs. 3 and 4 together constitute a top plan view of the camera on the scale of Fig. 2.

The apparatus comprises a trestle structure which provides support for the actual camera obscura itself together with its plate, plate holder, and, where half tone engraving is desired, its half tone screen and screen holder, and where photoprinting of flexible film is desired, a vacuum board to hold the film flat, and its lens, shutter, and filter panel and flashlight; for the copy board; and for the floodlights and their carriage, as well as for all coöperating parts, more specifically described below, which, all together, make a complete horizontal type photoengraving camera of the apparatus.

In the present description the front of the camera is regarded as being to the right in Fig. 1. Thus this figure, which is a side elevational view of the camera, is a right side view; and, as it shows the camera almost in its entirety, is the most comprehensive single figure of the drawing. It will be understood that apparatus of this nature is often of considerable size, lengths up to around twenty feet and heights of about seven to eight feet not being uncommon. The particular embodiment of the invention illustrated herein is an existing camera built in accordance with the invention and is about seventeen feet long. For this reason it has been necessary to break the trestle structure vertically in the mid-portion to condense the side elevation of Fig. 1. It will be understood from the figure itself and from the following that nothing essential to the disclosure and the claims has been left unillustrated.

The sectional view of Fig. 2 and the top plan view comprising Figs. 3 and 4 are enlarged fifty percent with respect to the scale of Fig. 1 so that certain important parts may be shown in greater detail. The increase in scale has made it necessary to omit part of the lower half of the cross section (Fig. 2), which is immaterial insofar as full illustration of the invention is concerned since Fig. 1 adequately illustrates the missing parts of the cross section, and to use two sheets for the top plan view, Fig. 3 covering the rear portion of the apparatus and Fig. 4 the front portion thereof. Certain parts, otherwise sufficiently well illustrated in Fig. 1, are omitted in Figs. 3 and 4.

The structure is such that a vertical plane dividing the apparatus longitudinally at the center separates two halves which are very nearly exactly symmetrical, almost every part on the right side, as illustrated in Fig. 1, having a corresponding part on the left side. Where, in the drawing, any such corresponding part is not illustrated in any figure such part will be understood to have the appearance of a mirror image of its companion part shown in Fig. 1 For example, it is assumed in Fig. 1 that the righthand floodlight completely obscures a reversed floodlight on the lefthand side of the camera.

The trestle structure is supported by six like legs, each of which is preferably a steel tube. There are three legs on each side, two close together at the rear, for reasons to be presently explained, and one at the front. The rear pair of legs are designated 10 and 11; the intermediate pair, 12 and 13; the front pair, 14 and 15, the even-numbered legs being on the right side. See Figs. 1, 3, and 4. All legs are fitted within suitable footings 16, adapted to be secured in suitable manner to a floor.

Surmounting legs 10 and 12 is a cap plate 17 rigidly secured to said legs. See Fig. 1. Likewise, surmounting legs 11 and 13, on the left side of the apparatus, is another cap plate 18. See Figs. 2 and 3. Upon each cap plate are rigidly secured six resilient mounts 19 arranged in two rows of three each, as best illustrated (in dotted lines) in Fig. 3. Each mount 19 is a pedestal comprising a rigid flanged base portion 20 housing a block 21 of resilient material, such as rubber, and, within the block, a bushing 22 through which passes a mounting pin or bolt 23.

All such mounting pins or bolts of the apparatus, there being twenty of them, are referred to as 23; however, to avoid confusion in the drawing only those four mounting pins or bolts 23 visible in Fig. 2 are indexed.

The entire assembly of photographic parts of the apparatus is, as has been said, rigid but adjustable; and this assembly rests upon twenty mounts 19 associated with the twenty mounting pins or bolts 23 mentioned above, and not directly upon the six rigid legs 10–15, inclusive. Thus the entire assembly of photographic parts floats above the legs as a rigid entity lying upon the resilient blocks 21.

Figs. 1 and 4 show that legs 14 and 15 are respectively surmounted by cap plates 24 and 25; each of these cap plates carries a square arrangement of four mounts 19, the mounts being, of course, rigidly secured to the plates.

Anchored by means of bolts 23 to the twelve mounts 19 at the rear of the apparatus, six of said mounts being carried by cap plate 17 and the other six thereof by cap plate 18, is a rigid, transverse, box-like frame comprising two parallel channels 26 and 27 set on edge with their flanges in opposition (see Fig. 1; also, Fig. 3; Fig. 2 shows the front channel 27 only). The channels 26 and 27 are suitably connected together within the frame structure and so form a partially enclosed housing for certain moving parts subsequently to be described.

Anchored to the four mounts 19 on cap plate 24 at the front of the apparatus is a plate 28; and anchored to the four mounts 19 on cap plate 25, also at the front of the apparatus, is a plate 29. Supported by and rigidly secured to these plates is a transverse channel 30, set on edge as shown in Fig. 1.

Lengthwise of the apparatus is another rigid, box-like frame comprising two parallel channels 31 and 32, the ends of which rest upon and are rigidly secured to channels 27 and 30 at the rear and front of the apparatus respectively, the channels 31 and 32 being cross connected intermediate their ends at intervals by suitable ties 33 of which one is best illustrated in Fig. 2 which includes a cross section of the lastnamed frame. The several ties 33 are preferably castings having the shape shown in Fig. 2. Other ties 33 are seen in Figs. 3 and 4.

The frame which comprises channels 31 and 32 serves as a hanger for tracks (more particularly described below) extending from the rear to the front of the apparatus.

The manner in which the tracks are hung from the frame is best illustrated in Fig. 2. Mounted opposite each other and respectively secured to the outsides of channels 31 and 32 are like lugs 34 and 35, the arrangement described being repeated at intervals along the frame, and, as a convenience, preferably in alignment with the stations of position of the ties 33. Each lug is vertically bored and tapped to receive a bolt 36, each bolt extending below the frame and engaging a cross tie 37 on the extremities of which are secured horizontal bars 38 and 39 of rectangular cross section, each such bar serving as a traction rail (see below).

On the top of each cross tie 37 at the righthand end thereof is a pillar block 40, and on the lefthand end thereof a similar pillar block 41, each pillar block being rigidly secured to the cross tie. The pillar blocks are not provided with caps. The arrangement of pillar blocks is of course understood to be repeated at intervals along the frame in accordance with the repetition of lugs 34 and 35 and ties 33. Resting on the series of pillar blocks 40 is a rigid shaft extending from the rear to the front of the apparatus; and, likewise, resting on the series of pillar blocks 41 is another rigid shaft also so extending. The righthand shaft is designated 42, the lefthand 43. Each shaft serves as a traction rail (see below); and each shaft is secured rigidly and nonrotatably to each pillar block of its related series by means of screws 44, each of which is passed upwardly through the cross tie 37 and through the center of the pillar block to engage a tapped bore in the underside of the shaft. See Fig. 2.

Figs. 3 and 4 show clearly the tracks provided by the bars 38 and 39 and by the shafts 42 and 43. It will be seen in Figs. 2, 3 and 4 that the track provided by the bars is of wider gage than that provided by the shafts, and, in Fig. 2, that the former track is lower in level than the latter.

A rigid frame, designated in its entirety as 45, is suspended from the track provided by the shafts 42 and 43 by means of brackets 46 and 47 each provided with a pair of V-wheels rotatably mounted on one of the shafts. See Fig. 1, wherein only bracket 46 is seen. In Figs. 2 and 3 both brackets are seen. Bracket 46 is secured to the upper righthand corner of the frame 45, and bracket 47 is secured to the opposite upper corner (cf. Fig. 2). The brackets are opposite hand to each other but otherwise alike. The forward V-wheel of bracket 46 is designated 48, the rear wheel, 49; the forward wheel of bracket 47 is designated 50, the rear wheel, 51 (see, particularly, Fig. 3). Each V-wheel is rotatably mounted on a stub shaft 52 which is rigidly secured to the related bracket (cf. Figs. 2 and 3).

Thus the frame 45 is actually a car which may be rolled backward and forward on the track provided by shafts 42 and 43. Details of the rest of the structure of frame 45 are discussed subsequently, it appearing desirable, now, to discuss, briefly, another frame, also suspended from the same track, and similarly provided with wheels whereby the frame may be rolled backward and forward like frame 45, so that means for motivating the two frames may be described to show, generally, the photographic coöperation between the two frames.

Another rigid frame 53, so designated in its entirety, is suspended from the track provided by shafts 42 and 43 by means of brackets 54 and 55 each provided (like brackets 46 and 47) with a pair of V-wheels rotatably mounted on one of the shafts. See Fig. 1, wherein only bracket 54 is seen. In Fig. 4 both brackets are shown. Bracket 53 is secured to the upper righthand corner of the frame 53, and bracket 55 is secured to the opposite upper corner; but, inasmuch as there is no elevational view showing bracket 55 it will be understood from the foregoing that bracket 55 has the appearance of a mirror image of bracket 54, which latter is shown in elevation in Fig. 1. The brackets are opposite hand to each other but otherwise alike. The forward V-wheel of bracket 54 is designated 56, the rear wheel, 57; the forward wheel of bracket 55 is designated 58, the rear wheel, 59 (see, particularly, Fig. 4). Each V-wheel is rotatably mounted on a stub shaft 60 which is rigidly secured to the related bracket (cf. Fig. 4).

Thus the frame 53, like the frame 45, is actually a car which may be rolled along the track similarly to a car of suspended tramway.

Further description of frame 53 will be deferred for reasons set forth above so that means for motivating the frames to vary their relative position, anteriorly and posteriorly, with respect to each other, may now be described.

Journaled at the rear in a bearing 61 which is secured to the channel 27 and at the front in another bearing 62 which is mounted on a special tie member 63 is a fore-and-aft screw 64. See, particularly, Fig. 3. Journaled at the rear in a bearing 65 which is also secured to channel 27 adjacent bearing 61 and at the front in another bearing 66 which is secured to the channel 30 is a shaft 67, the rear portion 68 of which is smooth and the fore portion of which is threaded and is designated 69. The shaft 67 may be made in two parts, the rear portion 68 actually being a separate shaft and the forward portion 69 being a screw (similar to screw 64), the two parts being coupled together in alignment intermediate of the apparatus (however, no coupling is shown in the drawing). See (for shaft 67) Figs. 1, 3, and 4. The screw 64 is obscured in Fig. 1 by shaft 67.

Screw 64 and shaft 67 are on the same level and are, of course, as shown in Fig. 3, parallel to each other, the former being slightly to the left of center of the apparatus and the latter an equal distance to the right thereof.

Mounted on frame 45 on the top front thereof is a bracket 70, seen in enlarged rear elevation in Fig. 4, the bracket being secured to the top of the frame by means of cap screws 71. A thickened portion of the bracket 70 extends above the frame 45 and is horizontally bored and tapped to receive, rotatably, the screw 64. Thus, by itself, the bracket 70 operates as a feed nut for the frame 45; but it is particularly desired herein to avoid any back lash when moving the frame 45 backward or forward to a new setting. For this reason an auxiliary nut 72 is provided and mounted on the screw 64 slightly forward of bracket 70. Three pins 73, the rear portions of which are threaded, are passed through the auxiliary nut 72 at intervals of 120° surrounding the screw 64 and are screwed into the bracket 70; and, surrounding each pin 73, is provided a compression spring 74 which, with its cooperating springs, exerts constant tension upon both the auxiliary nut 72 and the bracket 70. Due to the pins 73 it will be clear that the nut 72 cannot rotate relative to the bracket 70. Thus it will be seen that the arrangement comprising the bracket, nut, pins, and springs, maintains the bracket threads against the forward sides of the threads of screw 64 and the nut threads against the rear sides of the threads of the screw so that slip in the nature of back lash is prevented.

Mounted on frame 53 on the top front thereof is another bracket 75 which is a duplicate of bracket 70. The bracket 75 is secured to the top of frame 53 in a manner similar to that in which bracket 70 is secured to frame 45. Bracket 75, however, is secured to frame 53 so that the forward, or threaded, portion of shaft 67 may pass through the tapped bore of the bracket; thus bracket 70 is slightly to the right of center of the apparatus and bracket 75 equally distant to the left thereof. The bracket 75, by itself, operates as a feed nut for the frame 53; but, to prevent back lash, an auxiliary nut 76 (equivalent to nut 72) is provided, and is connected with bracket 75 by means of three pins 77 and compression springs 78 respectively equivalent to pins 73 and springs 74. The feed structure of frame 45 is duplicated in that of frame 53; and Figs. 3 and 4 are fully illustrative of both structures.

Mounted on the righthand end of the frame comprising channels 26 and 27 at the rear of the apparatus is a motor 79; and, on the lefthand end of the same frame, is a motor 80. The former is for the purpose of driving the shaft 67; the latter for the purpose of driving the screw 64. Journaled in the webs of channels 26 and 27 and extending between them is a shaft 81 on the right of the frame; and on the left thereof is a similarly journaled and disposed shaft 82. See Fig. 3; also, Fig. 2.

A chain 83 connects a sprocket 84 mounted on the armature shaft of motor 79 with a sprocket 85 mounted on shaft 81; and another chain 86 connects a second sprocket 87 also mounted on shaft 81 with a sprocket 88 mounted on the rear end of shaft 67. See, particularly, Fig. 3; also, Fig. 2.

Thus rotary motion is transmitted from motor 79 to the shaft 67.

A chain 89 connects a sprocket 90 mounted on the armature shaft of motor 80 with a sprocket 91 mounted on shaft 82; another chain 92 connects a second sprocket 93 also mounted on shaft 82 with a sprocket 94 mounted on the rear end of screw 64. See, particularly, Fig. 3; also, Fig. 2.

Thus rotary motion is transmitted from motor 80 to the screw 64.

Means for selectively operating the motors and for reversing the same are provided, and may be mounted conveniently upon the apparatus. The movement of frame 53 is of course a function of the rotation of shaft 81, and a dial 95, mounted on the rear end of said shaft, may be calibrated and provided with a suitable marker so that the photoengraver may guide himself in the operation of motor 79. So, too, is the movement of frame 45 a function of the rotation of shaft 82, and a dial 96, mounted on the rear end of said shaft, may be calibrated and provided with a suitable marker so that the photoengraver may guide himself in the operation of motor 80. It will be understood that behind the camera, when the same is installed, is customarily a dark room; and that during exposure of a plate it is not possible to see either frame 45 or frame 53 from the rear of the apparatus; and indicators of the relative positions of the two frames are required for blind focusing.

A chain 97 connects a third sprocket 98 mounted on shaft 81 with a sprocket 99 mounted on a stub shaft 100 suitably journaled on a bracket 101 secured in any suitable manner to the right side of the plate and screen housing 102 of the camera (see below). A handwheel 103 is mounted on stub shaft 100. By means of the handwheel 103 the operator may advance or retract frame 53 without using motor 79.

A chain 104 connects a third sprocket 105 mounted on shaft 82 with a sprocket 106 mounted on a stub shaft 107 suitably journaled on a bracket 108 secured in any suitable manner to the left side of the plate and screen housing 102. A handwheel 109 is mounted on stub shaft 107.

By means of the handwheel 109 the operator may advance or retract frame 45 without using motor 80.

The arrangements described in the last two paragraphs provide for vernier adjustments, as will be apparent.

By means of a pair of clamps 110 a standard 111, preferably a steel tube, is secured to and supported by leg 12 (cf. Fig. 1). Also by means of a like pair of clamps 112 another standard 113, similar to standard 111, is secured to and supported by leg 14 (cf. Fig. 1). On the top of standard 111 is fixed a mounting plate 114 and carried on this mounting plate is a member 115; and on top of standard 113 is fixed a similar mounting plate 116 and carried on this mounting plate is another member 115. The members 115 may be secured to their respective mounting plates in any suitable manner, as by a clamp 117 (see Fig. 2). The members 115 are preferably castings hollowed to receive by forcefitting the ends of an I-beam 118 which extends from the rear to the front of the apparatus.

By means of a pair of clamps 119 a standard 120, similar to the abovedescribed standards 111 and 113, is secured to and supported by leg 13 (illustrated best in Fig. 2, standard 111 obscuring standard 119 in Fig. 1; cf., also Fig. 3). Clamps 121 secure a fourth standard 122 (shown in dotted lines only, cf. Fig. 4; obscured by standard 113 in Fig. 1) to leg 15. Standards 120 and 122 are surmounted by cap plates and members 115 like the other standards. Another I-beam 123, forcefitted into the members 115 above standards 120 and 122, and corresponding to I-beam 118, and extending from the rear to the front of the apparatus together with the lastnamed I-beam forms a hanger system for a floodlight carriage more particularly described below.

Beneath each I-beam is secured a C-shaped channel: that on the right of the apparatus and relating to I-beam 118 is designated 124; that on the left and relating to I-beam 123 is designated 125. See Fig. 2. I-beam 123 is obscured by I-beam 118 in Fig. 1. The I-beams and their related channels are seen in cross section in Fig. 2. In Fig. 4 I-beam 123 and its channel 125 are partly broken away. Each C-shaped channel is open downwardly. The inner surfaces of the flanges of the channel serve, as will be presently made clear, as traction rails.

By means of brackets 126 another C-shaped channel similar to channel 124 and parallel thereto is suspended from I-beam 118; and by means of other brackets 126 another C-shaped channel similar to channel 125 and parallel thereto is suspended from I-beam 123. See Fig. 2; also Figs. 3 and 4. No part of the above described structure relating to the I-beam 123 is visible in Fig. 1 because the structure on the righthand side of the apparatus obscures that on the lefthand side. Channels so supported by brackets 126 are hoods for bus bars and are open at the bottom so that a shoe on either side of the floodlight carriage may pick up current from said bars.

Adapted to run along channel 124 is a four-wheeled trolley 127, and, adapted to run along channel 125, is another four-wheeled trolley 128; both trolleys are similar, and are rigidly connected together by means of a horizontal frame 129. At the righthand and lefthand end of the frame 129 is a suspended vertical bar 130 (see Fig. 2 particularly; also Fig. 1, wherein only the righthand bar 130 is seen). Each vertical bar 130 is adapted to carry, adjustably, a arc floodlight in the usual manner. The only floodlight L shown in the drawing is that on the righthand side of the apparatus and is seen in Fig. 1 only. It is presumed to obscure entirely a single floodlight on the left hand side of the apparatus.

The flood light carriage comprises, of course, the trolleys, the frame 129, and the suspended vertical bars 130. The carriage is adapted to be tied to the copyboard so that it moves with the latter (see below).

The frame 45 is adapted to support a lens board on which is mounted suitable mechanism controlling the lens, filter, compensating glass flashlight, and other camera elements associated with the shutter; and while such mechanism could be so supported otherwise, the frame 45 is specially adapted to support mechanism described and claimed in my copending United States application for patent Serial No. 90,312, filed Apr. 29, 1949.

However, for the purposes of the present disclosure, it is sufficient to set forth that the frame 45 supports a shutter 131 (see Fig. 2), a lens barrel 131a, a flashlight 132 (see Fig. 1), and a filter (not illustrated), and such other parts as are usual in a camera of the type described.

The frame 53 is adapted to carry a copy board. The copy board itself is, of course, no part of the present invention but the means for driving the same are herewithin included, and are subsequently described.

The bellows of the camera obscura are indicated in dotted lines in Fig. 1 and are designated 133.

The general housing for the plate and screen holders of the camera is designated 102 (see Figs. 1, 2, and 3).

I claim:

1. A camera stand having a beam mounted thereon; a plurality of transverse ties mounted on said beam; two parallel series of laterally adjustable pillow blocks mounted on said ties with a block of each series on each tie and the blocks of one series aligned with the blocks of the other series; a pair of rails, one rail being supported by all blocks of one series and the other rail being supported by all blocks of the other series; two carriages rollably mounted on said rails; a lens board mounted on one carriage; and a copy board mounted on the other carriage.

2. A camera stand having a beam mounted thereon; a plurality of transverse ties each adjustably suspended from said beam; two parallel series of laterally adjustable pillow blocks mounted on said ties with a block of each series on each tie and the blocks of one series aligned with the blocks of the other series; a pair of rails, one rail being supported by all blocks of one series and the other rail being supported by all blocks of the other series; two carriages rollably mounted on said rails; a lens board mounted on one carriage; and a copy board mounted on the other carriage.

3. In a camera of the class described, the combination of claim 1 including shock absorbing supports for said bridge member.

4. In a camera of the class described, the combination of claim 2 including shock absorbing supports for said bridge member.

5. In a camera of the class described, the combination of claim 1 including a pair of feed screws, each screw driving one of said carriages.

6. In a camera of the class described, the combination of claim 2 including a pair of feed screws, each screw driving one of said carriages.

7. In a camera of the class described, the combination of claim 1 including a pair of feed screws, each screw driving one of said carriages; and means mounted on each carriage for preventing backlash thereof with respect to its feed screw.

8. In a camera of the class described, the combination of claim 2 including a pair of feed screws, each screw driving one of said carriages; and means mounted on each carriage for preventing backlash thereof with respect to its feed screw.

9. In a camera of the class described, the combination of claim 1 wherein said rails are round, and wherein said carriages are provided with V-wheels engaging said rails.

10. In a camera of the class described, the combination of claim 2 wherein said rails are round, and wherein said carriages are provided with V-wheels engaging said rails.

11. In a camera of the class described, the combination of claim 1 including a pair of feed screws, each screw driving one of said carriages; means mounted on each carriage for preventing backlash thereof with respect to its feed screw; and indicators each thereof actuated in response to rotation of one of said feed screws and each calibrated in terms of axial distance measured on its respective screw.

12. In a camera of the class described, the combination of claim 2 including a pair of feed screws, each screw driving one of said carriages; means mounted on each carriage for preventing backlash thereof with respect to its feed screw; and indicators each thereof actuated in response to rotation of one of said feed screws and each calibrated in terms of axial distance measured on its respective screw.

13. In a camera of the class described, the combination of claim 1 including means for driving said carriages independently on said rails.

14. In a camera of the class described, the combination of claim 2 including means for driving said carriages independently on said rails.

15. In a camera of the class described, a trestle structure; a bridge member resiliently mounted thereon; a plurality of transverse ties mounted on said bridge member; two aligned series of pillow blocks, with one block of one series mounted on one side of each tie and with one block of the other series mounted on the other side of each tie; a pair of rails, one rail supported by all blocks of one series and the other rail supported by all blocks of the other series; two carriages rollably mounted on said rails; a lens board mounted on one carriage; a copy board mounted on the other carriage; means for independently driving said carriage on said rails; laterally adjustable standards mounted on said trestle structure; a track mounted on said standards; and a light carriage rollably mounted on said track, said light carriage being linked to said copy board.

16. In a camera of the class described, the combination of claim 15 wherein said rails are round.

17. In a camera of the class described, a trestle structure; a bridge member resiliently mounted thereon; a plurality of transverse ties each adjustably suspended from said bridge member; two aligned series of pillow blocks, with one block of one series mounted on one side of each tie and with one block of the other series mounted on the other side of each tie; a pair of rails, one rail supported by all blocks of one series and the other rail supported by all blocks of the other series; two carriages rollably mounted on said rails; a lens board mounted on one carriage; a copy board mounted on the other carriage; means for independently driving said carriages on said rails; laterally adjustable standards mounted on said trestle structure; a track mounted on said standards; and a light carriage rollably mounted on said track, said light carriage being linked to said copy board.

18. In a camera of the class described, the combination of claim 15 wherein said means comprise two independently rotatable feed screws each thereof engaging one of said carriages mounted on said rails.

19. In a camera of the class described, the combination of claim 17 wherein said means comprise two independently rotatable feed screws each thereof engaging one of said carriages mounted on said rails.

20. In a camera of the class described, the combination of claim 17 wherein said rails are round.

21. In a camera of the class described, the combination of claim 15 wherein said rails are round, and wherein the carriages mounted on said rails are provided with V-wheels engaging said rails.

22. In a camera of the class described, the combination of claim 17 wherein said rails are round, and wherein the carriages mounted on said rails are provided with V-wheels engaging said rails.

23. In a camera of the class described, the combination of claim 15 wherein said means comprise two independently rotatable feed screws each thereof engaging one of said carriages mounted on said rails, and including means mounted on said last named carriages for preventing backlash of said last named carriages with respect to their feed screws.

24. In a camera of the class described, the combination of claim 17 wherein said means comprise two independently rotatable feed screws each thereof engaging one of said carriages mounted on said rails, and including means mounted on said last named carriages for preventing backlash of said last named carriages with respect to their feed screws.

HERBERT GELB.

REFERENCES CITED

The following references are of record in the file of this patent:

UNITED STATES PATENTS

| Number | Name | Date |
|---|---|---|
| 1,033,404 | Huebner | July 23, 1912 |
| 1,597,598 | Jones | Aug. 24, 1926 |
| 1,847,010 | Koppe | Feb. 23, 1932 |
| 2,150,974 | Huebner | Mar. 21, 1939 |
| 2,356,960 | Wekeman | Aug. 29, 1944 |
| 2,376,416 | Campbell | May 22, 1945 |
| 2,441,687 | Crockett | May 18, 1948 |
| 2,519,609 | Sussin | Aug. 22, 1950 |